United States Patent
Chen et al.

(10) Patent No.: US 7,854,416 B2
(45) Date of Patent: Dec. 21, 2010

(54) DISPLAY PANEL AND ELEVATION ADJUSTING BASE OF THE SAME

(75) Inventors: Liang-Yi Chen, Jiali Township, Tainan County (TW); Chung-Hsien Chin, Taipei (TW)

(73) Assignee: Qisda Corporation, Taoyuan County (TW)

( * ) Notice: Subject to any disclaimer, the term of this patent is extended or adjusted under 35 U.S.C. 154(b) by 438 days.

(21) Appl. No.: 11/717,089

(22) Filed: Mar. 13, 2007

(65) Prior Publication Data
US 2007/0215776 A1 Sep. 20, 2007

(30) Foreign Application Priority Data
Mar. 16, 2006 (TW) .............................. 95109057 A

(51) Int. Cl.
*F16M 11/00* (2006.01)
(52) U.S. Cl. .................. 248/161; 248/132; 248/919; 361/679.05
(58) Field of Classification Search .............. 248/132, 248/161, 404, 410, 414, 157, 917, 919, 295.11, 248/297.11, 297.31, 297.51; 403/377, 359.5, 403/109.1, 109.3, 109.6, 365, 366, 372, 109.2, 403/109.5; 361/679.05, 679.21, FOR. 104, 361/FOR. 105
See application file for complete search history.

(56) References Cited
U.S. PATENT DOCUMENTS 2,628,142 A * 2/1953 Dubach ....................... 248/413
4,558,893 A * 12/1985 Shelly ......................... 285/354
6,027,087 A * 2/2000 Lindemann et al. ....... 248/188.5
6,520,192 B1 * 2/2003 Lo ............................. 135/25.4
6,663,057 B2 * 12/2003 Garelick et al. ........... 248/125.8
6,663,060 B1 * 12/2003 Gifford, Sr. .................. 248/161
7,195,214 B2 * 3/2007 Lee et al. .................. 248/125.8
7,290,742 B2 * 11/2007 Wang ....................... 248/200.1
2004/0231213 A1 11/2004 Ha et al.

FOREIGN PATENT DOCUMENTS

| CN | 1260153 A | 7/2000 |
|----|-----------|--------|
| CN | 1499536 A | 5/2004 |
| CN | 1575113 A | 2/2005 |
| EP | 1 013 195 A2 | 6/2000 |

* cited by examiner

Primary Examiner—A. Joseph Wujciak, III

(57) ABSTRACT

A display including a body and an elevation adjusting base is provided. The elevation adjusting base is secured to the body. The elevation adjusting base includes a base, an elevation adjusting mechanism, an outer bushing, an inner bushing and a friction ring. The elevation adjusting mechanism is connected to the base. The outer bushing is connected to the base and mounted on the elevation adjusting mechanism. The inner bushing is embedded inside the outer bushing. The friction ring is disposed between the outer bushing and the inner bushing. After the elevation of the elevation adjusting mechanism is adjusted, the friction ring provides a friction force between the outer bushing and the inner bushing to fix the elevation of the elevation adjusting mechanism. Users can accurately adjust the elevation of the display panel according to the view-angle and personal preferences.

13 Claims, 6 Drawing Sheets

DISPLAY PANEL AND ELEVATION ADJUSTING BASE OF THE SAME

This application claims the benefit of Taiwan application Serial No. 095109057, filed Mar. 16, 2006, the subject matter of which is incorporated herein by reference.

BACKGROUND OF THE INVENTION

1. Field of the Invention

The invention relates in general to a display, and more particularly to an elevation adjustable display.

2. Description of the Related Art

Liquid crystal display has become a main stream display device in electronic products. Compared with the conventional cathode ray tube (CRT) display, liquid crystal display has the advantages of compactness, light weight, and slimness. Currently, many users dispose a liquid crystal display on an elevation adjusting base so that the elevation of the liquid crystal display can be adjusted to fit the view-angle and users' personal preferences.

Referring to FIG. 1, a 3-D perspective of a conventional elevation adjusting base is shown. The display is disposed on the top plate 105. The body 101 is a hollow body for receiving the elevation shaft 103. The body 101 has a fixing spring 107. One end of the fixing spring 107 is fixed on the body 101, and the other end is fixed on the elevation shaft 103. The fixing spring 107 is used for providing a resisting force to support the gravity of the display. Let the weight of the display be W, and the elastic force of the fixing spring 107 be F. When W is larger than F, the elevation shaft 103 will drop to a balanced state. When F is larger than W, the elevation shaft 103 will rise to another balanced state. When the display is disposed on the top plate 105 and an user has already adjusted the elevation of the elevation adjusting base according to the view-angle and personal preference, the elevation of the elevation shaft 103 may not be able to meet the target elevation if the weight of the display is larger than or smaller than the elastic force of the fixing spring 107, causing inconvenience to the user.

SUMMARY OF THE INVENTION

The invention is directed to a display and an elevation adjusting base thereof allowing a user to adjust the elevation according to personal preferences. The display can be accurately adjusted to a target position by the user.

According to a first aspect of the present invention, a display including a body and an elevation adjusting base is provided. The elevation adjusting base is secured to the body. The elevation adjusting base includes a base, an elevation adjusting mechanism, an outer bushing, an inner bushing and a friction ring. The elevation adjusting mechanism is connected to the base. The outer bushing is connected to the base and mounted on the elevation adjusting mechanism. The inner bushing is embedded inside the outer bushing. The friction ring is disposed between the outer bushing and the inner bushing. After the elevation of the elevation adjusting mechanism is adjusted, the friction ring provides a friction force between the outer bushing and the inner bushing to fix the elevation of the elevation adjusting mechanism.

According to a second aspect of the present invention, an elevation adjusting base of a display is provided. The elevation adjusting base includes a base, an elevation adjusting mechanism, an outer bushing, an inner bushing and a friction ring. The elevation adjusting mechanism is connected to the base. The outer bushing is connected to the base and mounted on the elevation adjusting mechanism. The inner bushing is embedded inside the outer bushing. The friction ring is disposed between the outer bushing and the inner bushing. After the elevation of the elevation adjusting mechanism is adjusted, the friction ring provides a friction force between the outer bushing and the inner bushing to fix the elevation of the elevation adjusting mechanism.

The invention will become apparent from the following detailed description of the preferred but non-limiting embodiments. The following description is made with reference to the accompanying drawings.

BRIEF DESCRIPTION OF THE DRAWINGS (Prior Art) FIG. 1 is a 3-D perspective of a conventional elevation adjusting base;

DETAILED DESCRIPTION OF THE INVENTION

Figure 1:
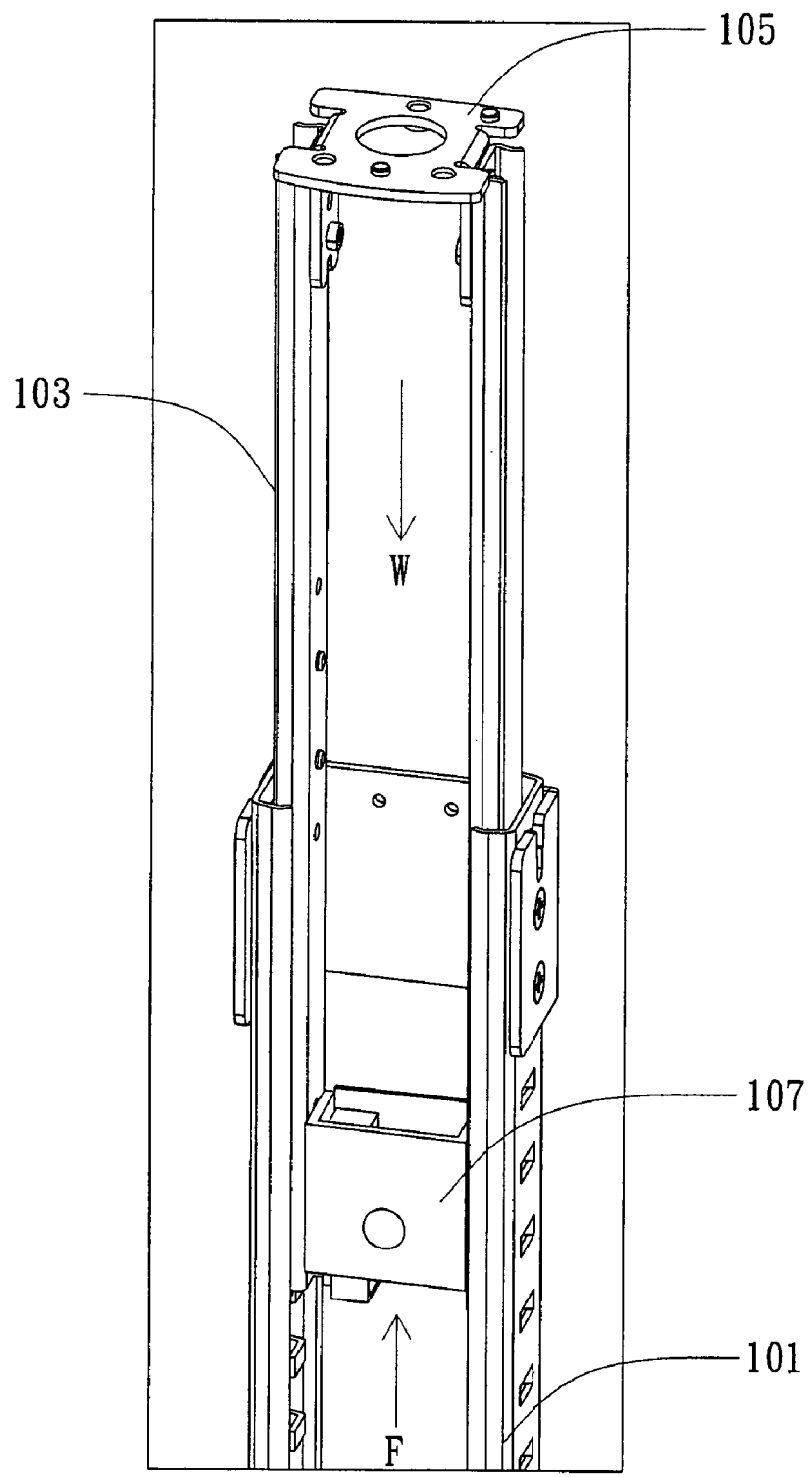
Figure 2A:
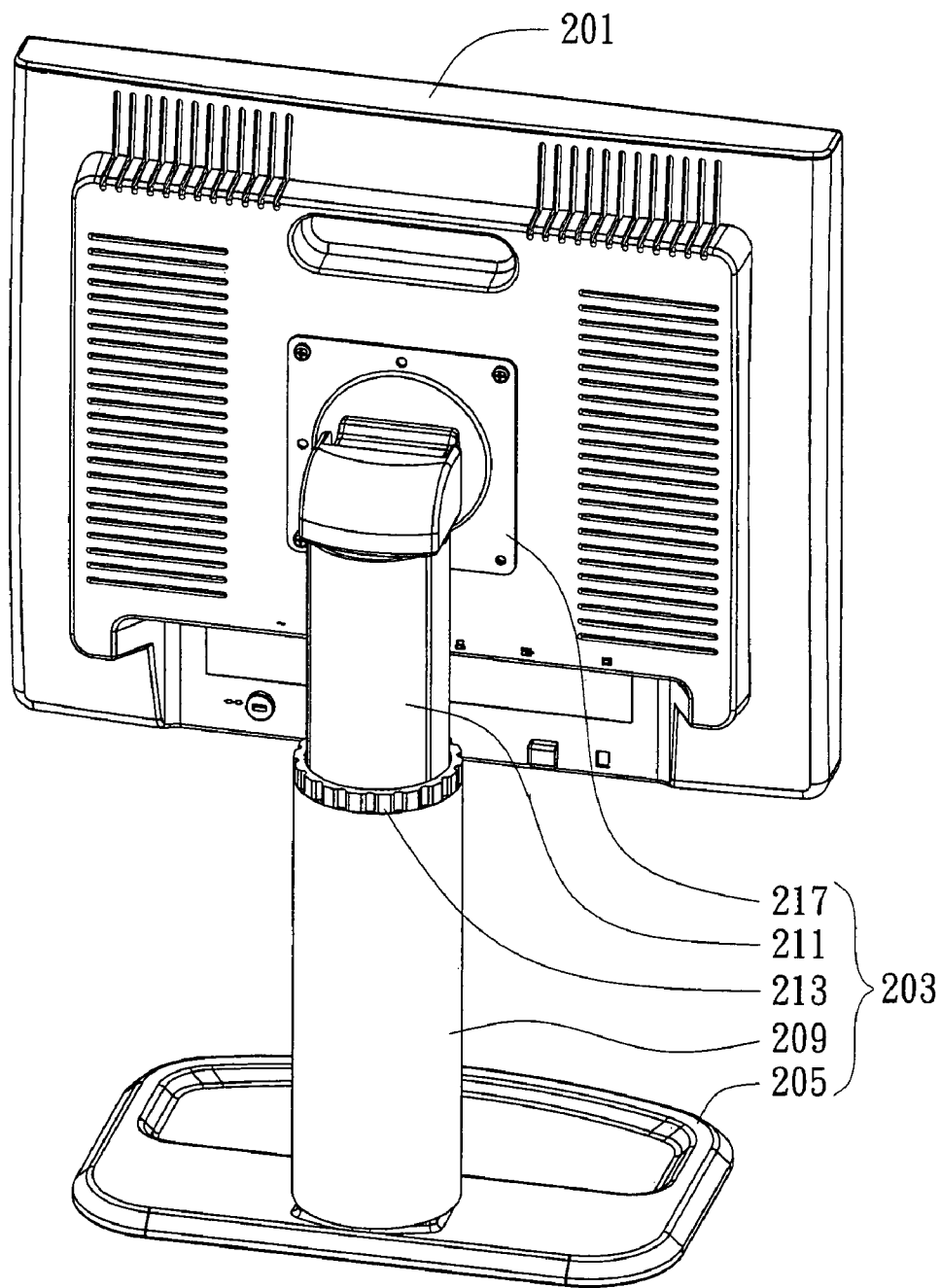
FIG. 2A is a 3-D perspective of a liquid crystal display.
Figure 2B:
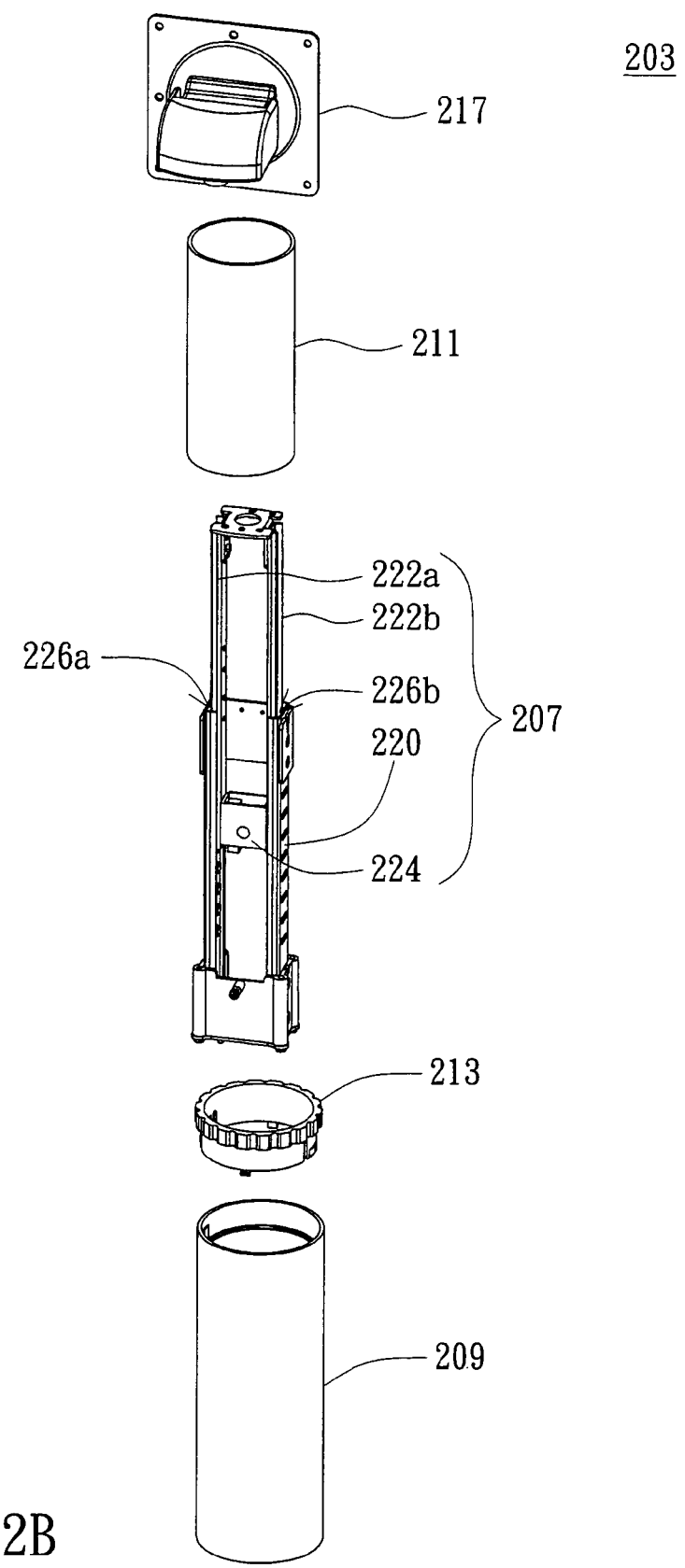
FIG. 2B is an exploded diagram of an elevation adjusting base.

Referring to both FIG. 2A and FIG. 2B. FIG. 2A is a 3-D perspective of a liquid crystal display. The display 200 includes a body 201 and an elevation adjusting base 203. The elevation adjusting base 203 is secured to the body 201. The elevation adjusting base 203 includes a base 205, an elevation adjusting mechanism 207 (illustrated in FIG. 2B), an outer bushing 209, an inner bushing 211, a friction ring 213 and a fixing part 217. The base 205 is used for supporting the weight of the body 201 and the elevation adjusting base 203. The elevation adjusting base 203 is secured to the inner bushing 211 and the body 201 via the fixing part 217. As indicated in FIG. 2B, the elevation adjusting mechanism 207 includes a body 220, an elevation shaft and an elastic element 224. Examples of the elevation shaft include a first elevation shaft 222a and a second elevation shaft 222b. The body 220 has at least an aperture. Examples of the aperture include a first aperture 226a and a second aperture 226b. The first elevation shaft 222a and the second elevation shaft 222b are movably and correspondingly disposed inside the first aperture 226a and the second aperture 226b. The elastic element 224 is preferably a fixing spring whose one end is fixed on the body 220 and the other end is fixed on elevation shaft to provide a restoring force to support the weight of the body 201. However, the elevation shaft is not limited to two shafts. As long as the shaft support the adjustment of the elevation will do.

Figure 3A:
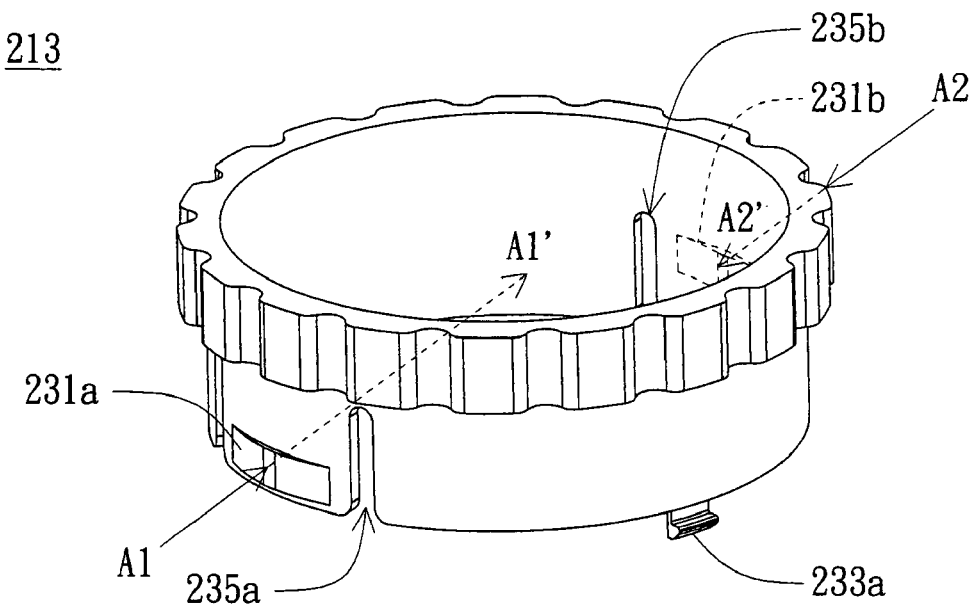
FIG. 3A is a 3-D perspective of a friction ring
Figure 4:
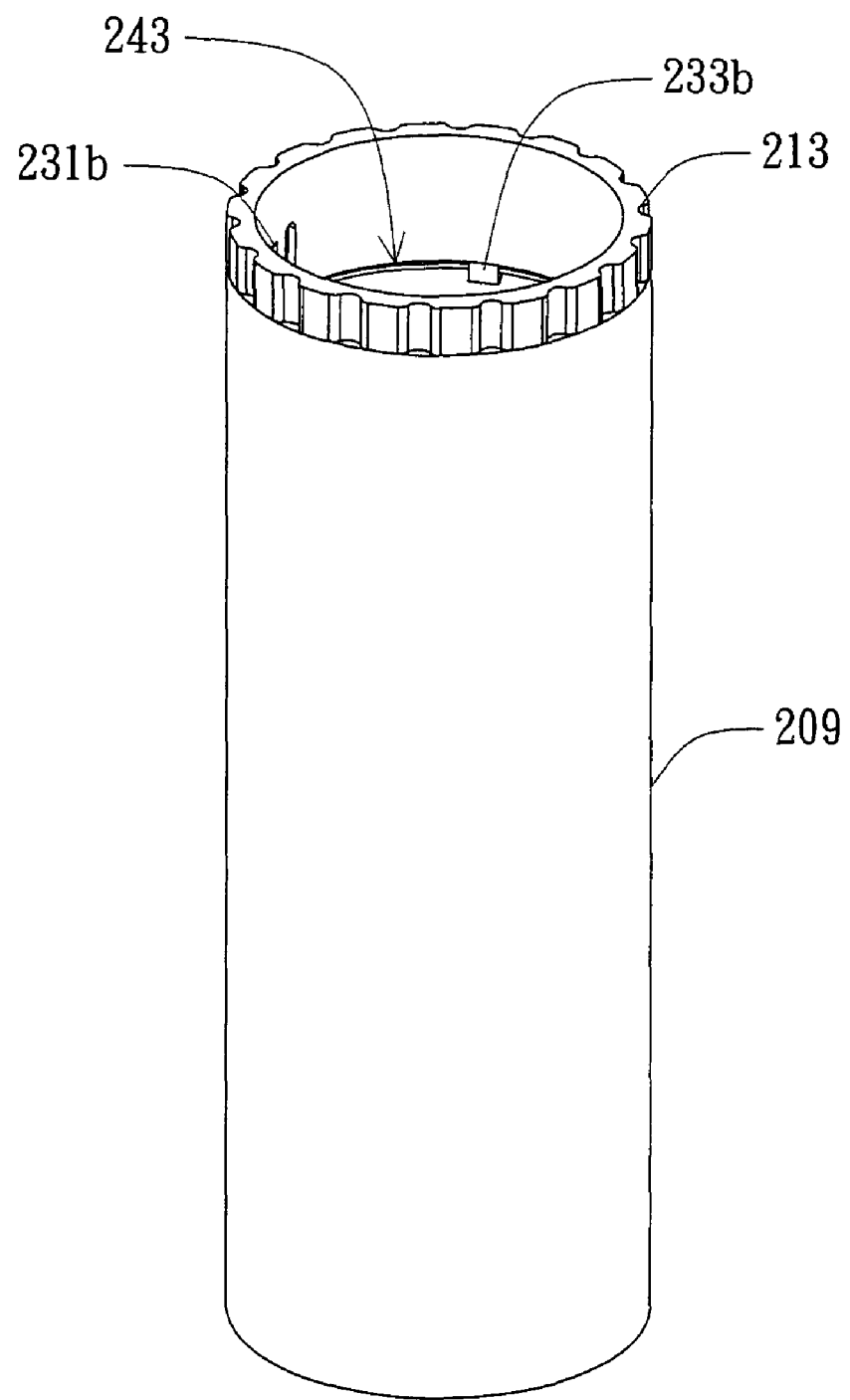
FIG. 4 is a 3-D perspective when the outer bushing and the friction ring are assembled.

With the disposition of the elastic element 224 alone to support the weight of the body 201, the elevation of the elevation adjusting base 203 is still unable to be accurately controlled due to the tolerance of the elastic element 224. Therefore, in the present embodiment of the invention, the friction ring 213 is disposed for enabling the user to more accurately control the elevation of the elevation adjusting base 203. Referring to FIG. 3A, a 3-D perspective of a friction ring is shown. The friction ring 213 has an inward protrusion and a bump. Examples of the inward protrusion include a first inward protrusion 231a and a second inward protrusion 231b. Examples of the bump include a first bump 233a and a second bump 233b as illustrated in FIG. 4. There are a first opening 235a and a second opening 235b disposed at the two sides of the first inward protrusion 231a and the second inward protrusion 231b. The first opening 235a and the second opening 235b are used for providing the first inward protrusion 231a and the second inward protrusion 231b with a deformation space. For example, when the first inward protrusion 231a and the second inward protrusion 231b are compressed from directions A1 and A2, the deformation space enables the first inward protrusion 231a and the second inward protrusion 231b to be moved towards directions A1' and A2' direction via the first opening 235a and the second opening 235b.

Figure 3B:
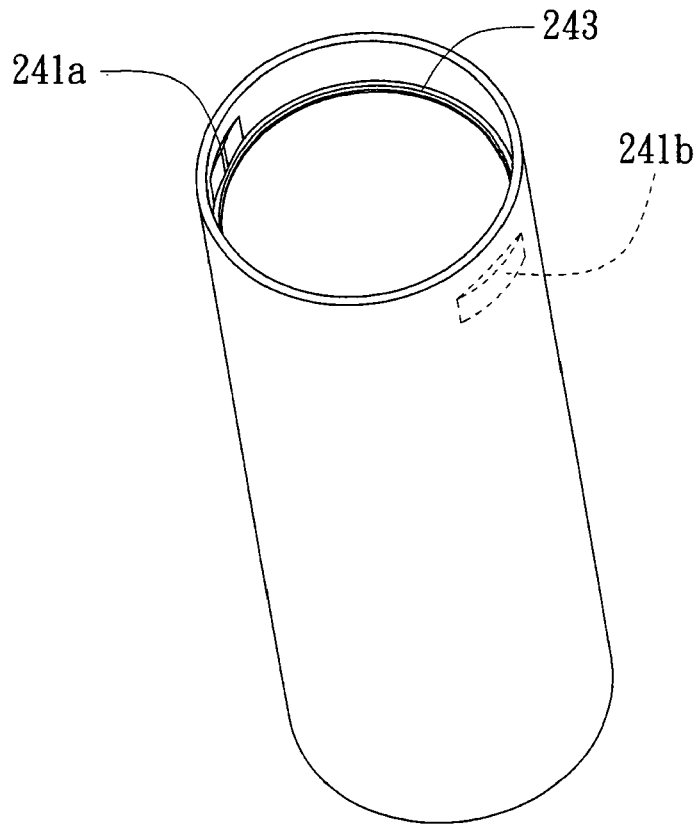
FIG. 3B is a 3-D perspective of an outer bushing.
Figure 3C:
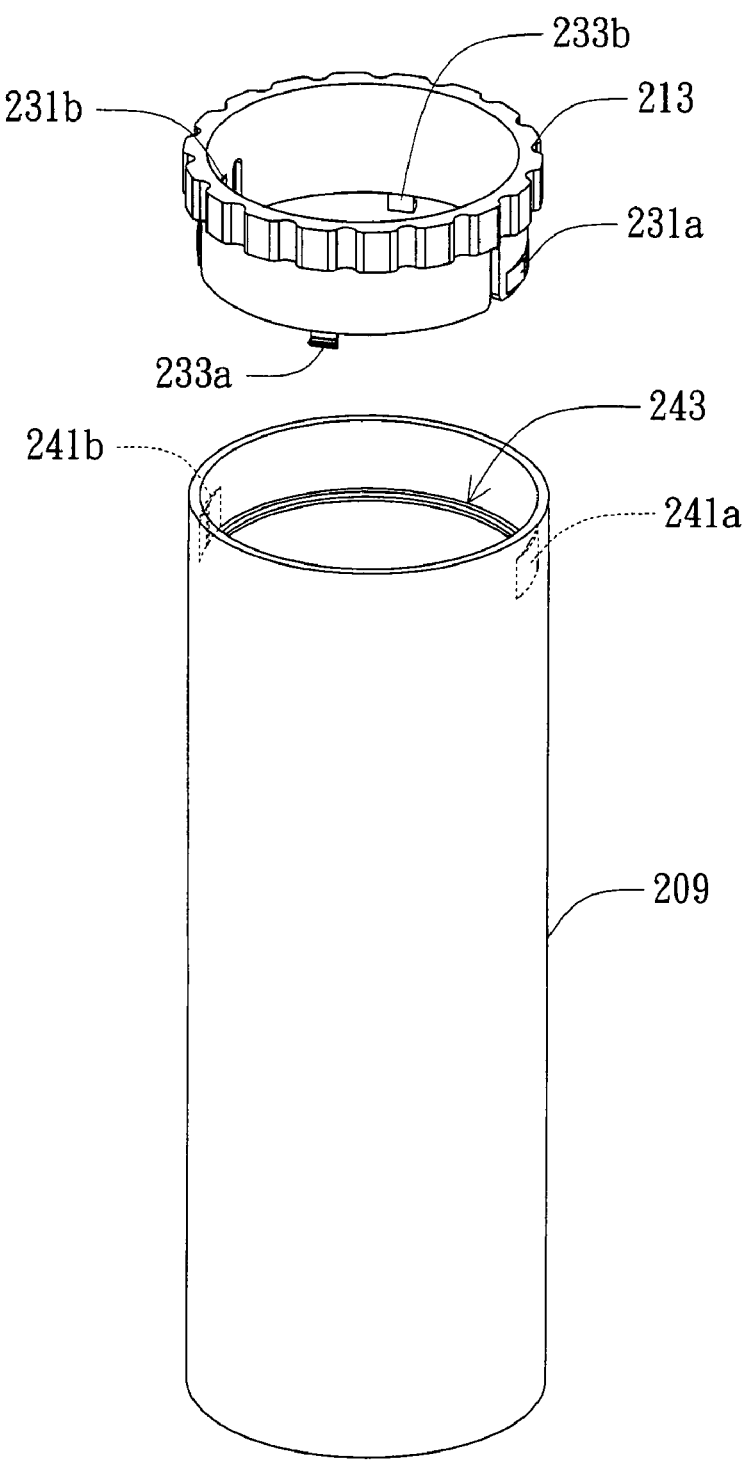
FIG. 3C is a 3-D perspective when the outer bushing and the friction ring are separated.

Referring to FIG. 3B, a 3-D perspective of an outer bushing is shown. The outer bushing 209 includes a guide rail 243 and an outward protrusion. Examples of the outward protrusion include a first outward protrusion 241a and a second outward protrusion 241b. The guide rail 243 surrounds the inner diameter of the outer bushing 209. Referring to FIGS. 3C and 4. FIG. 3C is a 3-D perspective when the outer bushing and the friction ring are separated. FIG. 4 is a 3-D perspective when the outer bushing and the friction ring are assembled. When the friction ring 213 is engaged inside the outer bushing 209, the first bump 233a and the second bump 233b can slide inside the guide rail 243. Therefore, when the friction ring 213 is rotated, the first bump 233a and the second bump 233b are moved along the guide rail 243. When the first inward protrusion 231a approaches the first outward protrusion 241a, the first outward protrusion 241a will compress the first inward protrusion 231a for enabling the first inward protrusion 231a to move inwardly. Likewise, the second outward protrusion 241b will compress the second inward protrusion 231b to move inwardly. The first inward protrusion 231a and the second inward protrusion 231b which are compressed inwardly will resist the inner bushing 211 (illustrated in FIG. 2B) to provide the inner bushing 211 with a friction force to halt the change in the elevation of the elevation adjusting base 203.

The display and the base thereof disclosed in the above embodiment of the invention are applicable to support different displays including liquid crystal display, plasma display and CRT display. Via the friction force provided by the friction ring, the user is able to accurately adjust the elevation of the display panel to fit the view-angle and personal preferences, further increasing product value.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An elevation adjusting base of a display, comprising:
   a base;
   an outer bushing connected to the base;
   an elevation adjusting mechanism connected to the base, wherein the outer bushing is placed adjacent to the elevation adjusting mechanism and the elevation adjusting mechanism comprises:
      an adjusting body disposed inside the outer bushing, wherein the adjusting body has an aperture;
      at least an elevation shaft movably disposed inside the aperture of the adjusting body for movement relative to the adjusting body, wherein a display body is fixed at the top of the elevation shaft to move along with the elevation shaft; and
      an elastic element disposed inside the adjusting body, and being connected to the adjusting body and the elevation shaft for providing a restoring force elastically supporting the weight of the display body;
   an inner bushing embedded and telescopically slidable inside the outer bushing; and
   a friction ring having at least an inward protrusion,
   wherein the inward protrusion is disposed between an inner wall of the outer bushing and an outer wall of the inner bushing, and after the elevation of the elevation adjusting mechanism is adjusted, the friction ring is rotated to move the inward protrusion, and the inward protrusion is clipped between the outer bushing and the inner bushing to provide a friction force between the outer bushing and the inner bushing to fix the elevation of the elevation adjusting mechanism.

2. The elevation adjusting base according to claim 1, wherein the outer bushing further has at least an outward protrusion, the friction ring has at least an inward protrusion, and when the friction ring is rotated for enabling the outward protrusion to correspond to the inward protrusion, the inward protrusion is engaged with the inner bushing to provide the friction force.

3. The elevation adjusting base according to claim 2, wherein there is at least an opening disposed at the two sides of the inward protrusion for providing a deformation space to the inward protrusion, and the inward protrusion can be compressed to squeeze the inner bushing via the deformation space.

4. The elevation adjusting base according to claim 1, wherein the top of the friction ring is tooth-shaped.

5. The elevation adjusting base according to claim 1, wherein the outer bushing further comprises a guide rail, the friction ring further comprises a bump, and when the friction ring is rotated, the bump slides along the guide rail.

6. The elevation adjusting base according to claim 1, wherein the elevation adjusting mechanism further comprises a fixing part secured to the inner bushing and the display body.

7. A display support for adjusting elevation of a display, comprising:
   a display body; and
   an elevation adjusting base secured to the display body, wherein the elevation adjusting base comprises:
      a base;
      an elevation adjusting mechanism connected to the base;
      an outer bushing connected to the base and placed adjacent to the elevation adjusting mechanism;
      an inner bushing embedded and telescopically slidable inside the outer bushing; and
      a friction ring having at least an inward protrusion;
      wherein the inward protrusion is disposed between an inner wall of the outer bushing and an outer wall of the inner bushing, and after the elevation of the elevation adjusting mechanism is adjusted, the friction ring is rotated to move the inward protrusion, the inward protrusion is clipped between the outer bushing and the inner bushing to provide a friction force between the outer bushing and the inner bushing to fix the elevation of the elevation adjusting mechanism, the outer bushing further has at least an outward protrusion, and when the friction ring is rotated for enabling the outward protrusion to correspond to the inward protrusion, the inward protrusion is engaged with the inner bushing to provide the friction force.

8. The display support according to claim 7, wherein the elevation adjusting mechanism comprises:
   an adjusting body disposed inside the outer bushing, wherein the adjusting body has at least an aperture;

at least an elevation shaft movably disposed inside the aperture of the adjusting body, wherein the display body is fixed at the top of the elevation shaft to move along with the elevation shaft; and an elastic element disposed inside the adjusting body and being connected to the adjusting body and the elevation shaft, for providing a restoring force elastically supporting the weight of the display body.

9. The display support according to claim 7, wherein there is at least an opening disposed at the two sides of the inward protrusion for providing a deformation space to the inward protrusion, and the inward protrusion can be compressed to squeeze the inner bushing via the deformation space.

10. The display support according to claim 7, wherein the top of the friction ring is tooth-shaped.

11. The display support according to claim 7, wherein the outer bushing further comprises a guide rail, the friction ring further comprises a bump, and when the friction ring is rotated, the bump slides along the guide rail.

12. The display support according to claim 7, wherein the elevation adjusting base further comprises a fixing part secured to the inner bushing and the display body.

13. A display support for adjusting elevation of a display, comprising:

a display body; and an elevation adjusting base secured to the display body, wherein the elevation adjusting base comprises:

a base;

an elevation adjusting mechanism connected to the base;

an outer bushing connected to the base and placed adjacent to the elevation adjusting mechanism;

an inner bushing embedded and telescopically slidable inside the outer bushing; and a friction ring having at least an inward protrusion;

wherein the inward protrusion is disposed between an inner wall of the outer bushing and an outer wall of the inner bushing, and after the elevation of the elevation adjusting mechanism is adjusted, the friction ring is rotated to move the inward protrusion, the inward protrusion is clipped between the outer bushing and the inner bushing to provide a friction force between the outer bushing and the inner bushing to fix the elevation of the elevation adjusting mechanism, the outer bushing further comprises a guide rail, the friction ring further comprises a bump, and when the friction ring is rotated, the bump slides along the guide rail.

* * * * *